United States Patent
Hellberg (12) 
(10) Patent No.: US 6,742,061 B1
(45) Date of Patent: May 25, 2004

(54) ACCESSORY CONTROL INTERFACE

(75) Inventor: Tino Hellberg, Littoinen (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/245,053

(22) Filed: Sep. 16, 2002

Related U.S. Application Data (60) Provisional application No. 60/362,908, filed on Mar. 8, 2002.

(51) Int. Cl.[7] .................................................. G06F 5/06
(52) U.S. Cl. .......................................... 710/58; 710/60
(58) Field of Search ..................... 710/58, 60; 713/501, 713/502, 600; 327/152; 375/219

(56) References Cited

U.S. PATENT DOCUMENTS

| | | | |
|---|---|---|---|
| 4,847,867 A | | 7/1989 | Nasu et al. |
| 5,432,468 A | * | 7/1995 | Moriyama et al. ........... 327/152 |
| 5,740,199 A | * | 4/1998 | Sibigtroth .................... 375/219 |
| 5,978,927 A | * | 11/1999 | Curry et al. ................. 713/502 |

* cited by examiner

Primary Examiner—Khanh Dang
(74) Attorney, Agent, or Firm—Harrington & Smith, LLP (57) ABSTRACT

Disclosed is an interface (10, 40) between a master device (30) and a slave device (20). The interface includes a bit serial bidirectional signal line (10A) for conveying commands and associated data from the master device to the slave device, and for conveying a reset signal, an interrupt signal, and a learning sequence signal for specifying a duration of a bit time for data transferred from the slave device to the master device. The bit serial bidirectional signal line further indicates an accessory device connected/disconnected state to the master device.

33 Claims, 5 Drawing Sheets

ACCESSORY CONTROL INTERFACE

CLAIM OF PRIORITY FROM A COPENDING U.S. PROVISIONAL PATENT APPLICATION

This patent application claims priority under 35 U.S.C. §119(e) from copending U.S. Provisional Patent Application No. 60/362,908, filed Mar. 8, 2002, incorporated by reference herein in its entirety.

TECHNICAL FIELD

These teachings relate generally to electronic devices, such as mobile terminals, including cellular telephones and personal communicators, and to accessory units for mobile terminals, and more specifically to mobile terminal/accessory interface hardware and software.

BACKGROUND

Modern mobile terminals, such as cellular telephones and personal communicators, are typically designed with an interface for connecting with external accessory devices. These accessory devices extend the functionality of the mobile terminal and/or provide other useful functions. Examples of accessories include battery chargers, headsets and "hands free" adapters (enabling the mobile terminal to be used without being held in the user's hand).

As can be appreciated, as the complexity of mobile terminals and their accessories have increased the required mobile terminal/accessory interface has increased in complexity as well. For example, the interface is typically required to accommodate the transfer of data between the mobile terminal and the accessory.

It is desirable that the mobile terminal/accessory interface be physically and electrically robust, be capable of handling low error rate data transfers, and yet still be low cost and of minimal complexity. Another important consideration is the power consumption of the mobile terminal/accessory interface. As in all battery powered devices, the minimization of power consumption is an important goal.

When using conventional accessory interfaces it has been problematic for the mobile terminal to detect certain specified accessories. Problems have also been observed using analog to digital converter (ADC)-based accessory detection schemes. Furthermore, with the ADC-based detection scheme there are only a limited number of accessories that can be identified (limited at least by the precision of the analog voltage that is produced to represent a given accessory, and by the conversion accuracy of the ADC in the mobile terminal).

Prior to this invention, all of the foregoing various and somewhat conflicting needs and goals have not been realized in circuitry that provides a mobile terminal/accessory interface, and the foregoing problems have not received a satisfactory resolution.

While described above in the context of mobile terminals, it should be appreciated that the same or similar problems can exist in other types of equipment.

SUMMARY OF THE PREFERRED EMBODIMENTS

The foregoing and other problems are overcome, and other advantages are realized, in accordance with the presently preferred embodiments of these teachings.

An Accessory Control Interface (ACI) encompasses an interface protocol and an accessory application specific integrated circuit (ASIC) that together provide an ability to identify, authenticate and control the operation of accessories used with a mobile terminal. In the preferred embodiment the ACI ASIC is installed within the accessory, and communicates through an input/output port and associated connector with circuitry in the mobile terminal.

Through the use of the ACI ASIC the mobile terminal is enabled to recognize when an accessory is inserted or removed. Preferably a mobile terminal interrupt signal line is activated by the ACI ASIC for interrupting the data processor of the mobile terminal. For example, when the mobile terminal is placed within a hands free (HF) stand the mobile terminal is automatically switched to the HF mode. When the mobile terminal is removed from the HF stand the mobile terminal is automatically switched out of the HF mode and back to the normal mode of operation. The ACI ASIC enables the interface to identify different accessory types by parameters stored as digital data within a memory of the ACI ASIC, and transferred to the mobile terminal using a serial data bus.

An important feature of this invention is the power savings that are realized, since after insertion detection is accomplished (the mobile terminal and accessory are physically and electrically coupled together) subsequent communications can be performed at a rate set by the low speed (e.g., 32 kHz) mobile terminal sleep clock. The sleep clock is one used to periodically interrupt the mobile terminal to exit a low power, idle mode of operation. This technique provides considerable savings in mobile terminal (and accessory) power consumption.

Another important feature is that the ACI ASIC includes or is coupled to a simple and inexpensive local oscillator that is implemented as an RC oscillator, as opposed to a crystal oscillator. This is made possible by the tolerance of the interface to the potentially wide frequency range (e.g., 20 kHz to 60 kHz, nominally about 27 kHz) and inaccuracy of the accessory RC oscillator (+−50%). The RC oscillator can be integrated into the ACI ASIC, thereby realizing considerable cost and circuit area savings, as well as improving the reliability and testability of the accessory and accessory interface.

A further advantage made possible by the use of this invention is the ability to design and offer new accessories, even for those mobile terminals that are already in the field. This is possible because the accessory is enabled to inform the mobile terminal of its relevant features due to the presence of a non-volatile memory within the ACI ASIC, where the memory stores feature data that is readable from the mobile terminal through the interface.

As will be shown below, this invention provides an interface between a master device and a slave device. The interface includes a bit serial bidirectional signal line for conveying commands and associated data from the master device to the slave device, and for conveying a reset signal, an interrupt signal, and a learning sequence signal for specifying a duration of a bit time for data transferred from the slave device to the master device. The bit serial bidirectional signal line further indicates an accessory device connected/disconnected state to the master device.

In the preferred embodiment the master device is or includes a mobile terminal. The mobile terminal samples the data transferred from the slave device to the master device in synchronism with its sleep clock. The interface includes, in the accessory device, an Accessory Control Interface chip and an on-chip RC oscillator providing a clock signal to the Accessory Control Interface chip. The bit time is a multiple of the clock signal, and the mobile terminal adapts the sampling of the data transferred from the slave device in accordance with the specified duration of the bit time.

The Accessory Control Interface chip further includes an on-chip non-volatile memory for storing at least accessory related feature data that is readable by the mobile terminal in response to a memory read command sent from the mobile terminal to the Accessory Control Interface chip over the bit serial bidirectional signal line.

The Accessory Control Interface chip further includes an on-chip challenge/response authentication function that is challenged in response to an authentication challenge command and associated challenge data sent from the mobile terminal to the Accessory Control Interface chip over the bit serial bidirectional signal line. Authentication result data is subsequently sent by the Accessory Control Interface chip to the mobile terminal over the bit serial bidirectional signal line in response to an authentication result command sent from the mobile terminal to the Accessory Control Interface chip.

While described herein in the context of a master device, or a mobile terminal, such as a mobile voice terminal such as a cellular telephone, this invention applies as well to personal digital assistants (PDAs) and other handheld or otherwise portable devices that are intended to be interfaced to external equipment, devices and/or accessories. As such, hereafter the term "mobile terminal", and also the term "master device", should be interpreted so as to include a wide variety of equipment types, both portable and non-portable, that include, but that are not limited to, cellular telephones, personal communicators, personal organizers, personal digital assistants (PDAs), email terminals, personal computers, laptop computers, notebook computers, workstations, home electronic devices, including game consoles as well as television monitors, and other devices that can be interfaced to external equipment, devices and/or accessories.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIGS. 3(A–F) are waveform diagrams that illustrate the format of a single logical 1 bit and logical 0 bit (FIG. 3A), the format of a transmission of a byte (8-bits) in bit serial format (FIG. 3B), the format of two data bursts (active mode) separated by a mobile terminal sleep mode period (FIG. 3C), a Reset pulse (FIG. 3D), a Learning Sequence (FIG. 3E), and an Interrupt (FIG. 3F);

DETAILED DESCRIPTION OF THE PREFERRED EMBODIMENTS

Figure 1:
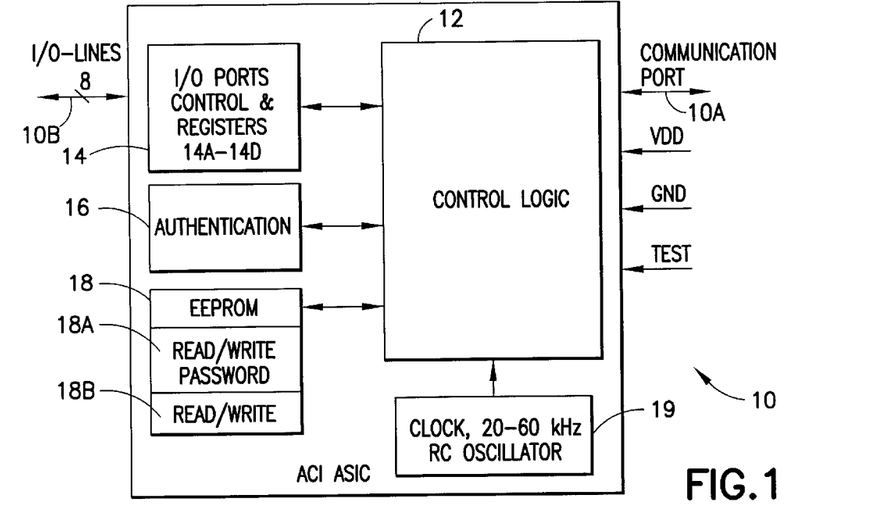
FIG. 1 is a block diagram of an embodiment of the Accessory Control Interface (ACI) ASIC that is constructed in accordance with this invention.

FIG. 1 illustrates a block diagram of one (non-limiting) embodiment of the Accessory Control Interface (ACI) ASIC 10 that is constructed in accordance with this invention. The ACI ASIC 10 includes a control logic block 12, an I/O port control registers and data registers block (I/O block) 14, an authentication block 16, a non-volatile memory 18 e.g., 32 bytes) having a read/write (R/W) with password memory portion 18A and a normal R/W portion 18B. The memory could be a EEPROM or other type of suitable memory device or devices. A clock, preferably implemented as a low cost, on-chip resistor/capacitor (RC) oscillator 19 (frequency range about 20 kHz to about 60 kHz) is also provided. The output of the RC oscillator 19 feeds the control logic block 12, and thus forms the master timing signal for the operation of the ACI ASIC 10, as well as controlling the timing of bit serial data that passes over the communications port 10A (preferably one signal line that operates in an asynchronous bit-serial format, as described in further detail below. A plurality of programmable I/O lines 10B (e.g., four or eight, depending on the embodiment) are also provided for controlling circuitry within the accessory that the ACI ASIC 10 is installed within (when programmed as outputs), or for reading back status and other signals (when programmed as inputs).

The authentication block 16 executes an authentication algorithm, preferably a challenge response type of algorithm, and can be used to verify that a given accessory is an authentic accessory, and not one provided from unauthorized third parties.

Reference can be had, for example, to commonly assigned U.S. Pat. No. 5,991,407 for a description of one type of authentication challenge/response system used in a radio-telephone network. Other or similar types of authentication challenge/response systems could be implemented as well with authentication block 16.

Figure 2:
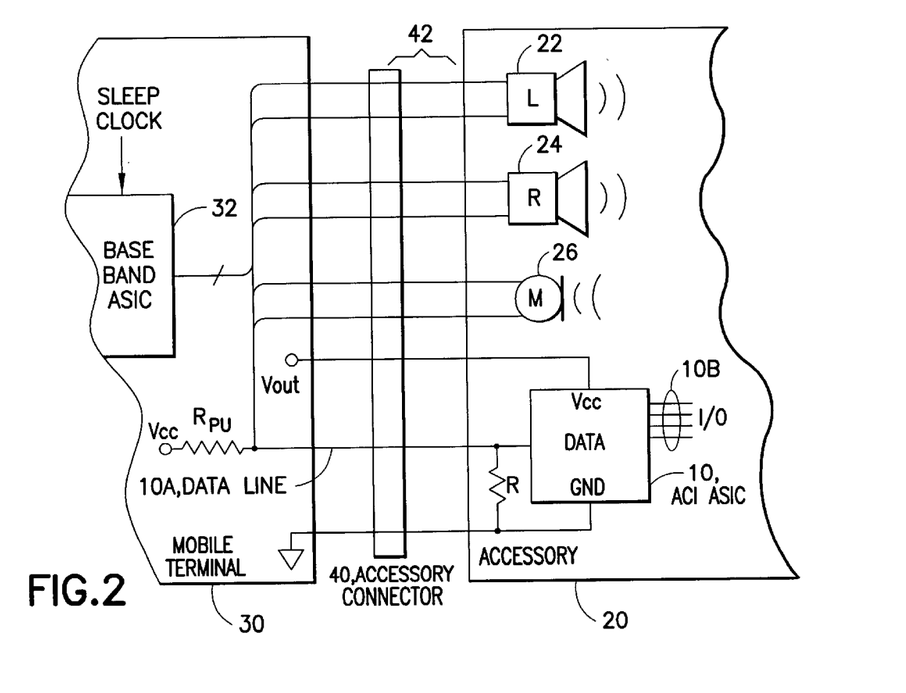
FIG. 2 is a block diagram showing the ACI ASIC of FIG. 1 installed within an exemplary accessory (a headset having speakers and a microphone), and the coupling between the ACI ASIC and a mobile terminal that includes a baseband ASIC.

Referring now also to FIG. 2, the ACI ASIC 10 is shown installed within an accessory 20, in this non-limiting example a headset accessory that includes left and right audio transducers (miniature speakers) 22 and 24, respectively, and a microphone 26. Connection is made to the accessory via an accessory connector 40, where one half of the connector 40 is installed in the mobile terminal 30 and the other half, the mating half, is installed in or connected to the accessory 20. A multi-wire cable 42 can be used to carry the required analog and digital signal lines between the mobile terminal 30 and the accessory 20. All of these signal lines are interfaced to suitable circuitry in the mobile terminal 30, shown for convenience as a baseband ASIC 32. The details of the circuitry that drives the audio transducers 22, 24, and that receives the audio signal from the microphone 26, are not germane to an understanding of this invention.

Figure 4:
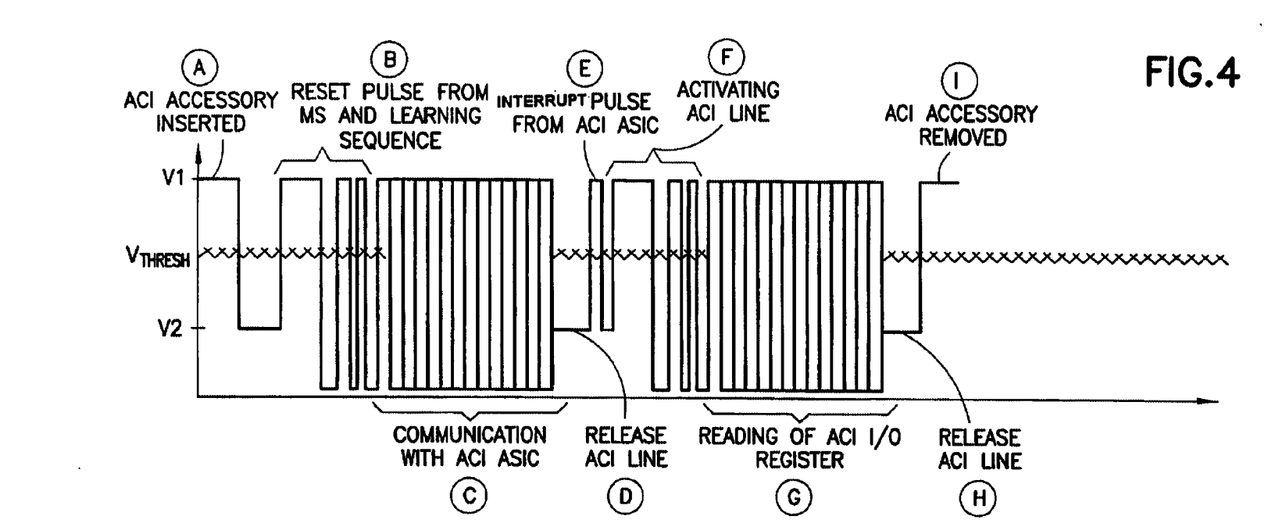
FIG. 4 illustrates an exemplary waveform that would appear on the bit serial data line shown in FIG. 2 from the time the accessory is inserted or attached to the mobile terminal to the time that it is removed or detached from the mobile terminal.

Of greater interest to the teachings of this invention is the interface to the bit serial, bidirectional data signal line 10A. Included in this interface is a resistance R coupled between signal line 10A and circuit ground, and a suitable pull-up resistance ($R_{PU}$) installed in the mobile terminal 10. By example, R may be a 56 k ohm resistor and $R_{PU}$ may be in the range of about 100 k to about 120 k ohms. R and $R_{PU}$ together form a resistor voltage divider network. When connected as shown, the presence of the resistance R affects the level of the signal line 10A, thereby enabling detection of the presence of the accessory 20 by the mobile terminal 30. Disconnection of the accessory is also detectable. Referring as well to FIG. 4, insertion of the accessory containing the ACI ASIC 10 and associated circuitry (point A) places $R_{PU}$ in series with R, thereby pulling the data signal line 10A down from a level V1 to a lower level V2 and crossing a detection threshold $V_{THRESH}$. (e.g., $V_{THRESH}$=0.74 Vcc).

Figure 6:
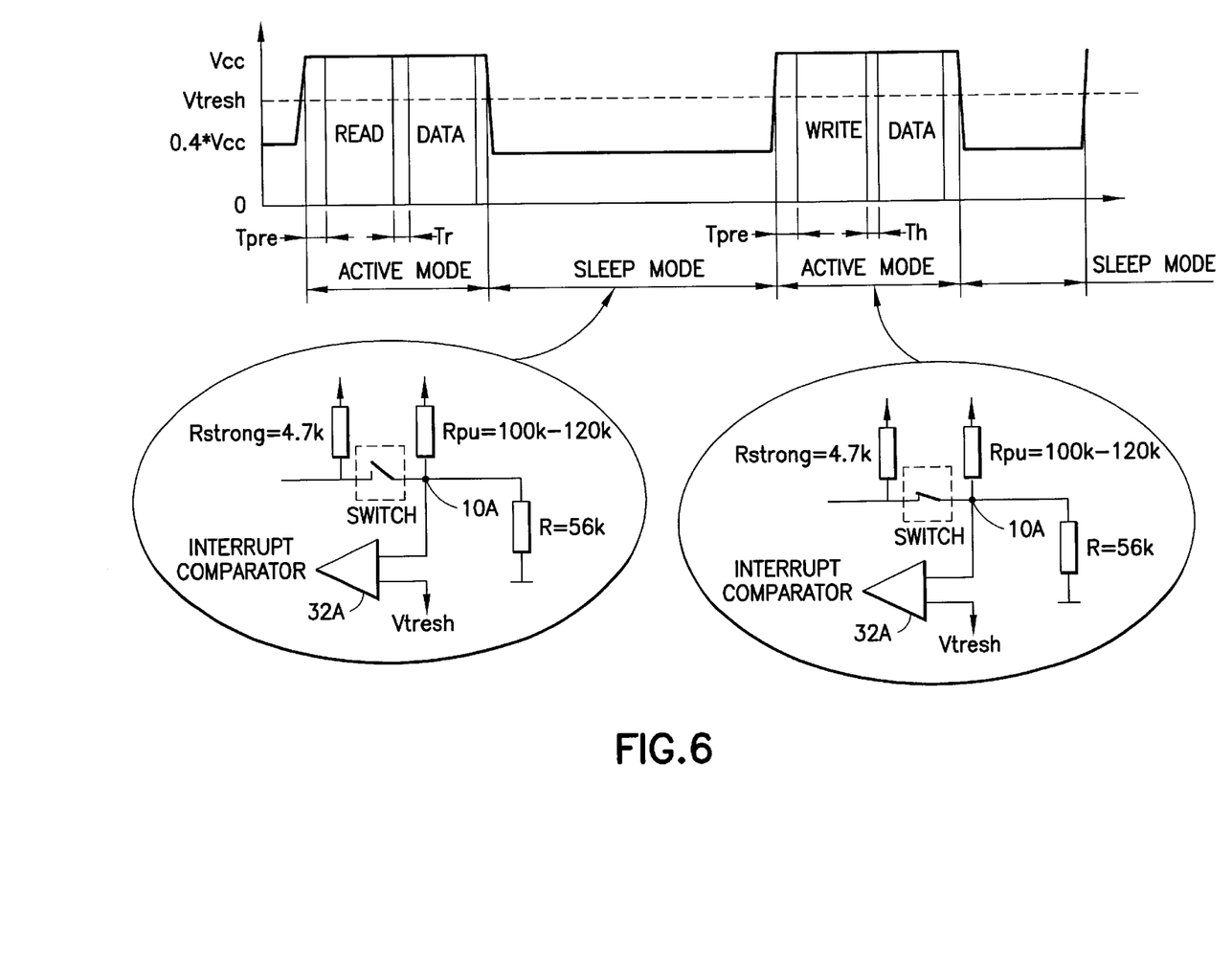
FIG. 6 is a waveform diagram that also illustrates an interrupt comparator used with a pull-up resistor that is switchably connected to the bit serial data line.

Referring now as well to FIG. 6, at points B, C, F and G the data signal line 10A is pulled up with a strong pull-up resistor ($R_{strong}$, e.g., 4.7 k) by the master device. This mode can be referred to as "data line reserved". In this mode the mobile terminal 30 and the ACI ASIC 10 can communicate by pulling the data signal line 10A low. At points D and H the data signal line is released and assumes the level of V2 (resulting from the action of resistor divider $R_{PU}$ and R. At point I the accessory 20 is detached, and $R_{PU}$ operates to pull up the level of data signal line 10A to V1 (e.g., to Vcc).

FIG. 6 also shows an interrupt comparator 32A and a Switch used for selectively coupling and decoupling $R_{strong}$ to the data signal line 10A. The comparator 32A operates to compare the voltage appearing on the data signal line to the $V_{THRESH}$ voltage.

Figure 3A:
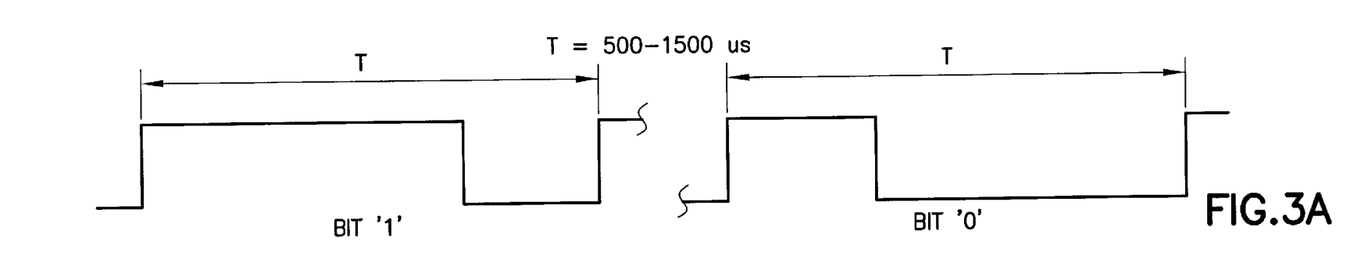

As shown in FIG. 3A, a single bit time T can be in the range of about 500 microseconds to about 1500 microseconds, depending on the frequency of the RC oscillator 19. More particularly, in a presently preferred, but non-limiting embodiment of this invention the control logic 12 operates with 30 clock cycles from the RC oscillator 19 to form the bit time. Assuming the lower frequency of 20 kHz, one clock cycle is 50 microseconds, and one bit time T is 30*50 microseconds or 1500 microseconds. Assuming the higher frequency of 60 kHz, one clock cycle is 16.6 microseconds, and one bit time T is 30*16.6 microseconds or 498 microseconds.

Figure 3B:
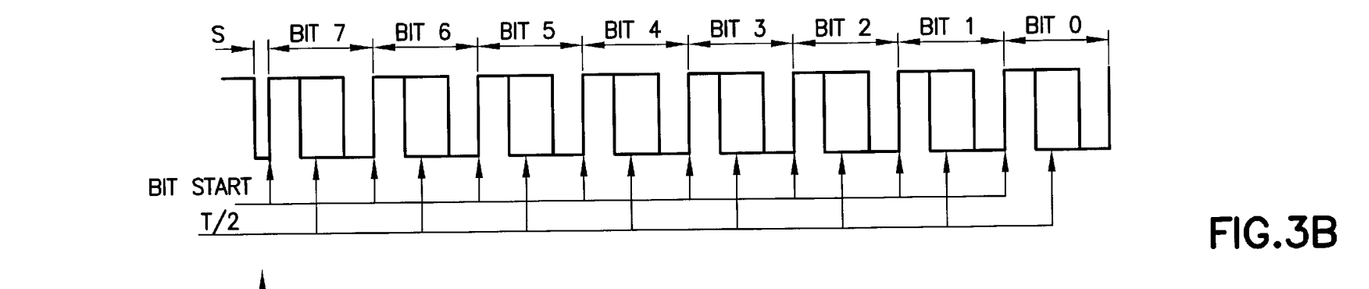

Each bit time is controlled by the control logic block 12 to begin as a positive transition and to end sometime after making a negative transition. When the negative transition is made defines whether the bit is a logic one (a late negative transition) or a logic zero (an early negative transition.) As seen in FIG. 3B, which illustrates a byte frame, by sampling the waveform at T/2 it is possible to detect whether a logic one or a logic zero bit is being transmitted, as the negative transition is arranged to occur either before or after T/2.

Other signal transition periods preferably signal other events. For example, and as is shown in FIG. 3D, holding the signal line 10A low for a period $T_{reset}$ (point B in FIG. 4) signals a warm (non-power on) reset state.

Figure 3C:
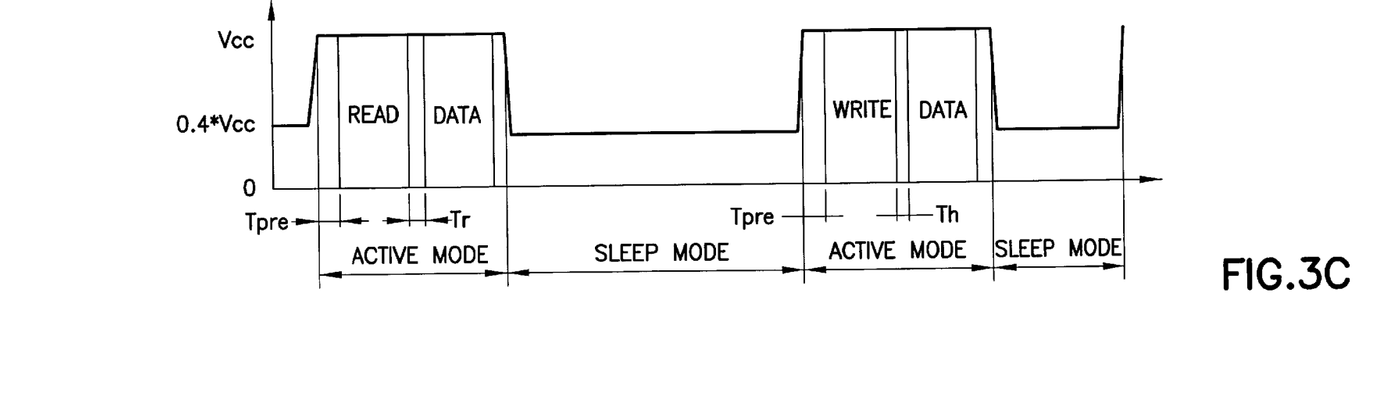
Figure 3D:
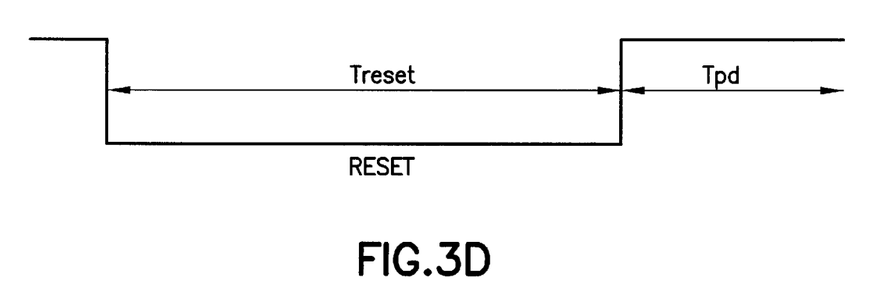
Figure 3E:
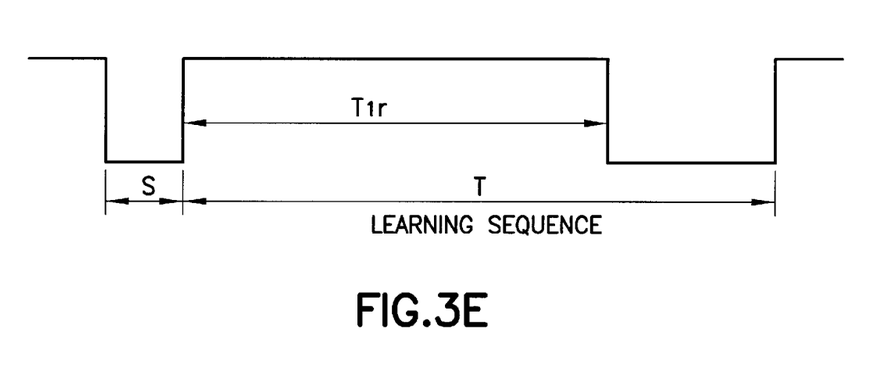

The data signal line 10A is also controlled to signal a Learning Sequence, as is illustrated in FIG. 3E. The Learning Sequence specifies the duration of T for an ensuing data transmission. Data transmission always begins by sending a logic one, which specifies the bit time T. This sequence is sent after a reset and at the beginning of a response from the ACI ASIC 10 (point B in FIG. 4). A low Start pulse period (S) starts each byte transmission for synchronization, and is greater than some minimum period (e.g., 50 microseconds). The start of the byte pulse is always generated by the sender of the byte.

Figure 3F:
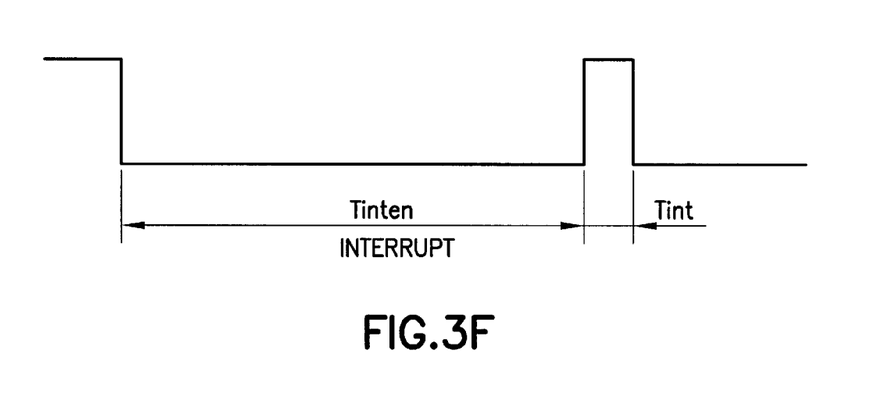

The data signal line 10A is also controlled to generate an Interrupt from the ACI ASIC 10, as shown in FIG. 3F. Assume that the data signal line free state is a logic zero, the ACI ASIC 10 then generates a pull-up pulse of duration $T_{int}$ if the following conditions are fulfilled: an interrupt option bit has been set in one of the control registers 14; the data signal line 10A has been free for period $T_{inten}$ (for example, for 200 internal clock cycles generated by the RC oscillator 19); and the state of the ASIC pin has been loaded into one of the data registers 14.

Figure 5:
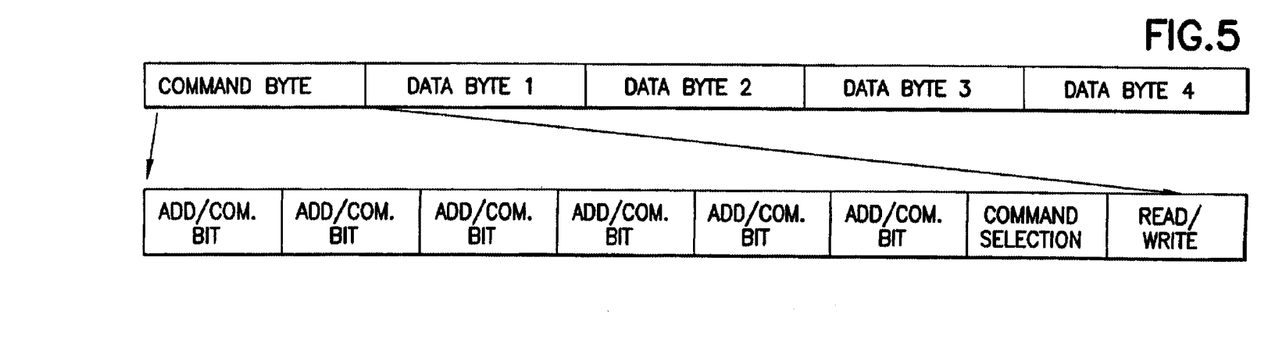
FIG. 5 illustrates a basic command data sequence, and the format of the initial command byte of the sequence.

FIG. 5 illustrates a basic command data sequence, and the format of the initial command byte of the sequence. The number of data bytes following the command byte are a function of the command. In the command byte format the first six bits specify an address to read/write in the memory 18, when the state of the Command Selection bit is in a first state (the Read/Write bit specifies read or write), while the first six bits specify a command, when the state of the Command Selection bit is in the other state. Exemplary commands include, but need not be limited to: Authentication Challenge, Authentication Response, Read/Write an Interrupt Option I/O register 14A, Read/Write a Data Direction I/O register 14B, Read/Write a Port I/O register 14C and Read a Latched I/O Port register 14D. The Authentication Challenge command (write) is followed by six data bytes (a 48-bit challenge word is presently preferred to input to the Authentication block 16), while the Authentication Response command is followed by three data bytes (a 24-bit response word is presently preferred to output from the Authentication block 16). The R/W I/O register commands are all followed by a single byte, as these registers are, in the current embodiment, one byte in width. For a write to I/O register operation the data byte is sourced from the mobile terminal 30. For a read access of an I/O register 14 the mobile terminal 30 sends the appropriate command byte on the data signal line 10A for specifying the I/O register to be read from, and the ACI ASCI 10 responds on the data signal line 10A with the data byte read from the specified I/O register location. The returned data byte is prefaced with the Learning Sequence (see FIG. 3E) that specifies the bit time T. Note as well that for a read of the EEPROM 18 the first byte returned from the ACI ASIC 10 is prefaced with the Learning Sequence, and the specified bit time T applies to the bits of the first returned data byte and any other returned bytes for that read operation. The same Learning Sequence operation is used for the first returned byte of the Authentication Response command, and the bit timing applies as well to the following two bytes of the three byte Authentication Response return. In this way the control logic block 12 is enabled to inform the data bit reading logic of the mobile terminal 10 of the duration of the bit time T for the impending data transfer, and the data bit reading logic is enabled to adjust the T/2 timing of its sampling of the data signal line 10A accordingly, thereby ensuring accurate reading of the transferred bits.

When an input mode is programmed for a given I/O pin 10B the pin state can be read from the I/O data register 14C. An internal pull-up resistor is preferably supplied for the I/O pins. If the interrupt enable bit is set from the Interrupt Option register 14A, and a state change in the I/O input pin occurs, the ACI ASIC 10 generates the Interrupt pulse to the data signal line 10A (see FIG. 3F). If a delay enable bit is set in the Interrupt Option register 14A, and the change of state occurs on the I/O pin, the ACI ASIC 10 instead latches the I/O pin input states to the Latched I/O Port register 14D after a delay (preferably about 20 milliseconds), and then generates the Interrupt pulse to the data signal line 10A. This mode of operation is useful, as an example, for debouncing accessory 20 switch contact closures.

Note in FIG. 3C that between two data transfer active modes is a mobile terminal sleep mode. Each active period can include a Command byte (read or write) and at least one data byte. The bit timing in the ACI ASIC 10 is preferably 30 clock cycles of the RC oscillator 19, which is possible to be read using the timing of the sleep clock (e.g., 32 kHz) of the mobile terminal 30. At the beginning of communication the mobile terminal 30 sends a Reset pulse (FIG. 3D) to the ACI ASIC 10 on the data signal line 10A, and the ACI ASIC 10 responds with the one bit Learning Sequence (FIG. 3E), enabling the mobile terminal 30 to adapt its bit receive timing (based on the 32 kHz sleep clock). In view of this adaptive bit serial timing arrangement between the mobile terminal 30 and the ACI ASIC 10 it can be appreciated that tight timing tolerances are not required between the mobile terminal 30 and the number of possible accessories 20 that it may operate with.

Reference with regard to radiotelephone operation with a sleep clock can be had to the following exemplary commonly-assigned U.S. Pat. Nos. 5,870,683; 5,758,278; 5,752,201; and 5,471,655, incorporated by reference herein insofar as there is no conflict with the teachings of this invention.

The memory 18 preferably stores data descriptive of the features of the accessory 20. As an example, and assuming the headset accessory, there may be a one row display having characters and four user-controlled switches or buttons, such as Answer/Call, Volume Up and Volume Down. Other stored parameters can include audio parameters such as echo cancellation on/off, gains and equalizations. All of this information can be communicated between the accessory 20 and the mobile terminal 30, enabling the mobile terminal 30 to configure and operate with a wide range of accessories, including accessories that are released for sale after the mobile terminal 30 is placed into service.

The use of the single bit serial data line 10A is also an advantage that accrues from the use of this invention, as this one signal line can be used for transferring data bidirectionally between the mobile terminal 30 and the accessory 20 containing the ACI ASIC 10, as well as for accessory insertion and removal detection, as well as for the adaptation of bit timing, reset and interrupt signalling.

While described in the context of the accessory 20 and ACI ASIC 10 being connected to the mobile terminal 30, it should be realized that the ACI ASIC 10 could be interfaced with other types of devices, such as a portable computer device, or a pager, or a PDA, or a home electronics device (including a game console), or any type of device that can be used with an attachable accessory device. In any of these embodiments the controlling device may be simply referred to as a master device, and the ACI ASIC 10 and the associated accessory as a slave device.

The teachings of this invention are also not intended to be limited in scope by, as examples, any of the specific frequencies, time periods, numbers of bits, numbers of bytes, types of commands, numbers of signal lines or registers and so forth that were discussed above. The ACI device is also not constrained to being implemented as an ASIC, as any suitable type of single chip or multiple chip integrated circuit embodiment can be used. In addition, the various blocks can be implemented in a number of suitable ways. For example, the control logic 12 could be implemented as combinatorial logic circuits, or as a state machine, or as a suitably programmed microprocessor core. The oscillator 19 could be implemented using discrete resistor and capacitor components, or it could be implemented using a crystal or a resonator or any suitable frequency signal generator.

Thus, while the foregoing discussion is has been made in the context of presently preferred embodiments of this invention, these presently preferred embodiments are not intended to be read as limiting the scope or the practice of this invention to only these embodiments.

What is claimed is:

1. An interface between a master device and a slave device, said interface comprising a bit serial bidirectional signal line for conveying commands and associated data from said master device to said slave device, said bit serial bidirectional signal line further conveying other signals, said other signals comprising a reset signal, an interrupt signal, and a learning sequence signal for specifying a duration of a bit time for data transferred from said slave device to said master device, where said interface comprises, in said slave device, an Accessory Control Interface chip and an oscillator providing a clock signal to said Accessory Control Interface chip, where the bit time is a multiple of the clock signal, and where said master device adapts the sampling of the data transferred from said slave device in accordance with the specified duration of the bit time.

2. An interface as in claim 1, where said master device is comprised of a personal digital assistant.

3. An interface as in claim 1, where said master device is comprised of a mobile terminal.

4. An interface as in claim 3, where said mobile terminal samples the data transferred from said slave device to said master device at a rate established by a mobile terminal sleep clock.

5. An interface as in claim 1, where said interface comprises, in said slave device, an Accessory Control Interface chip and a non-volatile memory for storing slave device related feature data that is readable by said master device over said bit serial bidirectional signal line in response to a memory read command sent from said master device to said Accessory Control Interface chip over said bit serial bidirectional signal line.

6. An interface as in claim 1, where said interface comprises, in said slave device, an Accessory Control Interface chip and a challenge/response authentication function that is challenged in response to an authentication challenge command and associated challenge data sent from said master device to said Accessory Control Interface chip over said bit serial bidirectional signal line, and where authentication result data is sent by said Accessory Control Interface chip to said master device over said bit serial bidirectional signal line in response to an authentication result command sent from said master device to said Accessory Control Interface chip over said bit serial bidirectional signal line.

7. An interface as in claim 1, where said bit serial bidirectional signal line further conveys a slave device connected/disconnected state to said master device.

8. An interface circuit for coupling a slave device to a master device, said interface circuit supporting a bit serial bidirectional signal line that conveys commands and associated data from said master device to said slave device, said bit serial bidirectional signal line further conveying other signals, said other signals comprising a reset signal, an interrupt signal, and a learning sequence signal for specifying a duration of a bit time for data transferred from said slave device to said master device, where said interface circuit comprises, in said slave device, an Accessory Control Interface chip and an oscillator providing a clock signal to said Accessory Control Interface chip, where the bit time is a multiple of the clock signal, and where said master device adapts the sampling of the data transferred from said slave device in accordance with the specified duration of the bit time.

9. An interface circuit as in claim 8, where said interface circuit is disposed within said slave device and comprises an oscillator for generating a clock signal, where the bit time is a multiple of the clock signal period, and where said master device samples said bit serial bidirectional signal line in accordance with the specified duration of the bit time.

10. An interface circuit as in claim 8, where said interface circuit is disposed within said slave device and comprises a non-volatile memory for storing slave device related feature data that is readable by said master device over said bit serial bidirectional signal line in response to a read command sent from said master device to said interface circuit over said bit serial bidirectional signal line.

11. An interface circuit as in claim 8, where said interface circuit is disposed within said slave device and comprises a challenge/response authentication function that is challenged in response to an authentication challenge command and associated challenge data received from said master device over said bit serial bidirectional signal line, and where authentication result data is sent to said master device over said bit serial bidirectional signal line in response to receiving an authentication result command from said master device over said bit serial bidirectional signal line.

12. An interface circuit as in claim 8, where said bit serial bidirectional signal line further conveys a slave device connected/disconnected state to said master device.

13. An interface circuit as in claim 8, where said master device is comprised of a mobile terminal.

14. An interface circuit as in claim 13, where said mobile terminal samples said bit serial bidirectional signal line at a rate established by a mobile terminal sleep clock.

15. An interface circuit as in claim 8, where said master device is comprised of a personal digital assistant.

16. An interface circuit for coupling a slave device to a master device, said interface circuit being disposed in said slave device and supporting a bit serial bidirectional signal line that conveys commands and associated data from said master device to said slave device, said bit serial bidirectional signal line further conveying other signals, said other signals comprising a reset signal, where said interface circuit comprises, in said slave device, an Accessory Control Interface chip and an oscillator providing a clock signal to said Accessory Control Interface chip, where the bit time is a multiple of the clock signal, and where said master device adapts the sampling of the data transferred from said slave device in accordance with the specified duration of the bit time.

17. An interface circuit as in claim 16, where said other signals further comprise an interrupt signal and a learning sequence signal for specifying a duration of a bit time for data transferred from said slave device to said master device.

18. An interface circuit for coupling a slave device to a master device, said interface circuit being disposed in said slave device and supporting a bit serial bidirectional signal line that conveys commands and associated data from said master device to said slave device, said bit serial bidirectional signal line further conveying other signals, said other signals comprising an interrupt signal, where said interface circuit comprises, in said slave device, an Accessory Control Interface chip and an oscillator providing a clock signal to said Accessory Control Interface chip, where the bit time is a multiple of the clock signal, and where said master device adapts the sampling of the data transferred from said slave device in accordance with the specified duration of the bit time.

19. An interface circuit as in claim 18, where said other signals further comprise a reset signal and a learning sequence signal for specifying a duration of a bit time for data transferred from said slave device to said master device.

20. An interface circuit for coupling a slave device to a master device, said interface circuit being disposed in said slave device and supporting a bit serial bidirectional signal line that conveys commands and associated data from said master device to said slave device, said bit serial bidirectional signal line further conveying other signals, said other signals comprising a learning sequence signal for specifying a duration of a bit time for data transferred from said slave device to said master device, where said interface circuit comprises, in said slave device, an Accessory Control Interface chip and an oscillator providing a clock signal to said Accessory Control Interface chip, where the bit time is a multiple of the clock signal, and where said master device adapts the sampling of the data transferred from said slave device in accordance with the specified duration of the bit time.

21. An interface circuit as in claim 20, where said interface circuit comprises an oscillator for generating a clock signal, where the duration of the bit time is a multiple of the clock signal period, and where said master device samples said bit serial bidirectional signal line in accordance with the specified duration of the bit time.

22. An interface circuit as in claim 21, where a logic zero and a logic one are distinguished by a presence or absence of a transition occurring on said bit serial bidirectional signal line by a predetermined point in the specified duration of the bit time.

23. An interface circuit as in claim 22, where the specified duration of the bit time is given by T, and where the predetermined point is about T/2.

24. An interface circuit as in claim 20, where said interface circuit comprises at least one register that is readable by said master device over said bit serial bidirectional signal line.

25. An interface circuit as in claim 20, where said interface circuit comprises at least one register that is writable by said master device over said bit serial bidirectional signal line.

26. An interface circuit as in claim 20, where said interface circuit comprises at least one memory device location that is readable by said master device over said bit serial bidirectional signal line.

27. An interface circuit as in claim 20, where said interface circuit comprises at least one memory device location that is writable by said master device over said bit serial bidirectional signal line.

28. An interface circuit as in claim 20, where said interface circuit comprises an authentication block that is addressable by commands sent by said master device over said bit serial bidirectional signal line, and that responds to at least one command with response data sent to said master device over said bit serial bidirectional signal line.

29. An interface circuit as in claim 20, where said other signals further comprise a reset signal and an interrupt signal.

30. A method for communicating between a master device and a slave device, comprising:

coupling the slave device to the master device through an interface, the interface comprising a bit serial bidirectional signal line;

sending a reset signal from the master device to the slave device over the bit serial bidirectional signal line;

sending a learning sequence signal to the master device over the bit serial bidirectional signal line for specifying a duration of a bit time for data transferred between the master device and the slave device; and communicating at least one of data and commands between the master device and the slave device over the bit serial bidirectional signal line, wherein said interface comprises, in said slave device, an Accessory Control Interface chip and an oscillator providing a clock signal to said Accessory Control Interface chip, where the bit time is a multiple of the clock signal, and where said master device adapts the sampling of the data transferred from said slave device in accordance with the specified duration of the bit time.

31. A method as in claim 30, where communicating comprises the master device sampling the bit serial bidirectional signal line in accordance with the specified duration of the bit time.

32. A method as in claim 31, where a logic zero and a logic one are distinguished by a presence or absence of a transition occurring on the bit serial bidirectional signal line by a predetermined point in the specified duration of the bit time.

33. A method as in claim 32, where the specified duration of the bit time is given by T, and where the predetermined point is about T/2.

* * * * *